United States Patent
Wawrowski et al.

(10) Patent No.: US 9,730,026 B2
(45) Date of Patent: Aug. 8, 2017

(54) METHOD AND APPARATUS FOR FORMING COMMUNICATION GROUP BASED ON LOCATION HISTORY

(71) Applicant: MOTOROLA SOLUTIONS, INC, Schaumburg, IL (US)

(72) Inventors: Mariusz R. Wawrowski, Wawrzenczyce (PL); Pawel Jurzak, Cracow (PL); Wojciech Jan Kucharski, Podkarpackie (PL); Robert Mrowiec, Liszki (PL); Michal Szychowski, Cracow (PL); Grzegorz Szyszka, Kraków (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/880,863

(22) Filed: Oct. 12, 2015

(65) Prior Publication Data

US 2016/0105773 A1    Apr. 14, 2016

(30) Foreign Application Priority Data

Oct. 13, 2014   (EP) ...................................... 1446066

(51) Int. Cl.
*H04W 24/00*    (2009.01)
*H04W 4/02*    (2009.01)
(Continued)

(52) U.S. Cl.
CPC ............. *H04W 4/028* (2013.01); *H04W 4/08* (2013.01); *H04W 4/10* (2013.01)

(58) Field of Classification Search
CPC .......... H04W 4/028; H04W 4/08; H04W 4/10
(Continued)

(56) References Cited

U.S. PATENT DOCUMENTS 6,477,387 B1    11/2002   Jackson et al.
7,272,382 B2    9/2007   Servi et al.
(Continued)

FOREIGN PATENT DOCUMENTS

EP      2 745 585 A1    6/2014
WO    2010/140907 A1    12/2010

OTHER PUBLICATIONS

European Search Report, European Patent Application No. 144600665, Munich, Mar. 11, 2016.
(Continued)

*Primary Examiner* — Marcos Batista

(57) ABSTRACT

Communication groups are formed based on mobile station location history. The process includes receiving, at a controller device, a group formation request from a requesting device, the request specifying a location and a time window, identifying one or more mobile stations determined to be within a threshold area relative to the location during the time window, and causing a communication group to be created including the identified one or more mobile stations. A further process includes a requesting device configured to identify a location and time window associated with an event, transmit a group formation request specifying the location and the time window and requesting formation of a communication group comprising mobile stations located within a threshold area relative to the location during the time window, and transmit using a communication group identifier provided to the requesting device.

17 Claims, 8 Drawing Sheets

(51) Int. Cl.
*H04W 4/10* (2009.01)
*H04W 4/08* (2009.01)

(58) Field of Classification Search
USPC .............................. 455/546.1–456.3; 370/338
See application file for complete search history.

(56) References Cited

U.S. PATENT DOCUMENTS

| | | |
|---|---|---|
| 7,643,840 B2 | 1/2010 | Shim |
| 7,983,659 B2 | 7/2011 | Shinya |
| 8,103,300 B2 | 1/2012 | Gogic |
| 8,195,215 B2 | 6/2012 | Marocchi et al. |
| 8,260,338 B2 | 9/2012 | Shaffer et al. |
| 8,271,631 B1 | 9/2012 | Horvitz et al. |
| 8,611,910 B2 | 12/2013 | Christensen et al. |
| 8,620,371 B2 | 12/2013 | Jorgensen |
| 8,761,812 B2 | 6/2014 | Hawkins et al. |
| 8,787,944 B2 | 7/2014 | Smith |
| 2009/0079622 A1 | 3/2009 | Seshadri et al. |
| 2009/0247191 A1 | 10/2009 | Sennett et al. |
| 2010/0058196 A1 | 3/2010 | Krishnan et al. |
| 2010/0070758 A1 | 3/2010 | Low et al. |
| 2011/0035384 A1 | 2/2011 | Qiu |
| 2013/0315107 A1 | 11/2013 | Lindner et al. |
| 2013/0316687 A1 | 11/2013 | Subbaramoo et al. |
| 2014/0057645 A1 | 2/2014 | Chowdhary et al. |
| 2014/0113674 A1* | 4/2014 | Joseph ................ H04W 4/021 455/519 |
| 2014/0133318 A1 | 5/2014 | Kuehner |
| 2014/0213295 A1 | 7/2014 | Conklin |

OTHER PUBLICATIONS

"WiGLE: Wireless Network Mapping," WiGLE.NET, Retrieved from the Internet URL: https://wigle.net/, retrieved on Feb. 23, 2016, Copyright 2001-2016 bobzilla && arkasha && uhtu, pp. 1-2.

Baouche, C. et al., "Routing mechanism for a DTN using WSN nodes for localization applications," Conference Paper, Proceedings of the IEEE International Conference on Networking, Sensing and Control, ICNSC 2011, Delft, The Netherlands, Apr. 11-13, 2011, pp. 1-6.

Fingas, J., "Qualcomm releases proximity beacons that track Android and iOS shoppers," Published on Sep. 12, 2013, Retrieved from the Internet URL: http://www.engadget.com/2013/12/09/qualcomm-gimbal/, retrieved on Feb. 23, 2016, pp. 1-9.

Opoku, S.K., "An Indoor Tracking System Based on Bluetooth Technology," Networking and Internet Architecture (cs. NI), Sep. 13, 2012, Retrieved from the Internet URL: http://arxiv.org/ftp/arxiv/papers/1209/1209.3053.pdf, retrieved on Feb. 23, 2016, pp. 1-8.

* cited by examiner

METHOD AND APPARATUS FOR FORMING COMMUNICATION GROUP BASED ON LOCATION HISTORY

This application is a US National Filing and is filed within one year of, and claims priority to under 35 U.S.C. §119, European Patent Application No. EP 14460066.5, filed in the European Patent Office on Oct. 13, 2014, the entire contents of which are incorporated herein by reference.

BACKGROUND OF THE INVENTION

Radio access networks (RANs) provide for radio communication links to be arranged within the network between a plurality of user terminals. Such user terminals may be mobile and may be known as 'mobile stations' or 'subscriber units.' At least one other terminal, e.g. used in conjunction with mobile stations (MSs), may be a fixed terminal, e.g. a base station, eNodeB, repeater, and/or access point. Such a RAN typically includes a system infrastructure that generally includes a network of various fixed terminals, which are in direct radio communication with the MSs. Each of the fixed terminals operating in the RAN may have one or more transceivers which may, for example, serve MSs in a given region or area, known as a 'cell' or 'site', by radio frequency (RF) communication. The MSs that are in direct communication with a particular fixed terminal are said to be served by the fixed terminal. In one example, all radio communications to and from each MS within the RAN are made via respective serving fixed terminals. Sites of neighboring fixed terminals may be offset from one another and may be non-overlapping or partially or fully overlapping with one another.

RANs may operate according to any one of a number of available industry standard broadband protocols such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs that may include third generation and fourth generation networks such as third generation partnership project (3GPP) Long Term Evolution (LTE) networks.

RANs may additionally or alternatively operate according to an industry standard land mobile radio (LMR) protocol such as, for example, the Project 25 (P25) standard defined by the Association of Public Safety Communications Officials International (APCO), or other radio protocols, the Terrestrial Trunked Radio (TETRA) standard defined by the European Telecommunication Standards Institute (ETSI), the Digital Private Mobile Radio (dPMR) standard also defined by the ETSI, or the Digital Mobile Radio (DMR) standard also defined by the ETSI. Because these systems generally provide lower throughput than the 3 GPP and LTE systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols. Mobile stations in RANs such as those set forth above send and receive audio and/or data (e.g., encoded voice, audio, video, images, control information, text messages, instant messages, short message service (SMS), multimedia message service (MMS), e-mail, and/or audio/video streams) in accordance with the designated protocol.

OMA-PoC, in particular, enables familiar PTT and "instant on" features of traditional half duplex MSs, but uses MSs operating over modern cellular telecommunications networks. Using PoC, MSs such as mobile telephones and notebook computers can function as PTT half-duplex MSs for transmitting and receiving auditory data. Other types of PTT models and multimedia call models (MMCMs) are also available. Still further, other types of communications models for transmission and reception of other types of data are available as well.

Floor control in an OMA-PoC session, in one example, is generally maintained by a PTT server that controls communications between two or more MSs. When a user of one of the MSs keys a PTT button, a request for permission to speak in the OMA-PoC session is transmitted from the user's MS to the PTT server using, for example, a real-time transport protocol (RTP) message. If no other users are currently speaking in the PoC session, an acceptance message is transmitted back to the user's MS and the user can then speak into a microphone of the MS. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the received auditory data packets to other users of the PoC session (e.g., to other MSs in the group of MSs or talkgroup to which the user is subscribed), using for example a unicast, multicast, or broadcast communication technique.

Narrowband LMR systems, on the other hand, operate in either a conventional or trunked configuration. In either configuration, a plurality of MSs are partitioned into separate groups of MSs. In a conventional system, each MS in a group is selected to a particular frequency for communications associated with that MS's group. Thus, each group is served by one channel, and multiple groups may share the same single frequency (in which case, in some embodiments, group IDs may be present in the group data to distinguish between groups using the same shared frequency). Communications in a conventional system may take place via an infrastructure-provided repeater or repeaters, or directly via a direct mode (including talk-around) protocol.

In contrast, a trunked radio system and its MSs use a pool of traffic channels for virtually an unlimited number of groups of MSs (e.g., talkgroups). Thus, all groups are served by all channels. The trunked radio system works to take advantage of the probability that not all groups need a traffic channel for communication at the same time. When a member of a group requests a call on a control or rest channel on which all of the MSs in the system idle awaiting new call notifications, in one embodiment, a call controller assigns a separate traffic channel for the requested group call, and all group members move from the assigned control or rest channel to the assigned traffic channel for the group call. Communications then take place via the assigned traffic channel repeater. In another embodiment, when a member of a group requests a call on a control or rest channel, the call controller may convert the control or rest channel on which the MSs were idling to a traffic channel for the call, and instruct all MSs that are not participating in the new call to move to a newly assigned control or rest channel selected from the pool of available channels. With a given number of channels, a much greater number of groups can be accommodated in a trunked system as compared with conventional radio systems. In a trunked system, communications may also take place directly between MSs when operating in a talk-around mode (e.g. direct mode when infrastructure devices are also available). In some embodiments, group data transmissions may occur in a trunked radio system on an assigned trunked traffic channel, while in other embodiments, the group data transmissions may occur on an assigned data revert channel. Other possibilities exist as well.

Group communications such as group audio calls or group data transmissions may be made between wireless and/or wireline participants in accordance with either a narrowband or a broadband protocol or standard. Group members for group communications may be statically or dynamically defined. That is, in a first example, a user or administrator working on behalf of the user may indicate to the switching and/or radio network (perhaps at a radio controller, call controller, controller device, PTT server, zone controller, or mobile management entity (MME), base station controller (BSC), mobile switching center (MSC), site controller, Push-to-Talk controller, or other network device) a list of participants of a group at the time of the group communication or in advance of the group communication. The group members (e.g., MSs) could be provisioned in the network by the user or an agent, and then provided some form of group identity or identifier, for example. Then, at a future time, an originating user in a group may cause some signaling to be transmitted indicating that he or she wishes to establish a group communication session with each of the pre-designated participants in the defined group. In another example, MSs may dynamically affiliate with a group (and also disassociate with the group) perhaps based on user input or infrastructure controller device configuration or action, and the switching and/or radio network may track group membership and route new group communications according to the current group membership. In some instances, a group of MSs may be identified as a communication group, and a communication initiated to members of that communication group (whether including the synchronous or asynchronous transmission of audio or other data noted above) may be identified as a group communication session.

Communication groups may be used to communicate between groups of currently active MSs, where the groups are conventionally created (statically or dynamically) based on a type of currently active MS user or created based on a currently occurring event or incident, such as groups of currently active fire fighters, currently active police, currently active store employees, or currently active government agency employees, for responding to a currently occurring incident at a particular location.

For example, as shown in FIG. 1, an incident/response area 100 may have a defined location 102 and may have a response boundary 104 statically defined at a fixed distance 106 from the defined location 102. In other embodiments, response boundary 104 may represent a maximum transmission range of BS 130 if it were positioned at defined location 102. Various potential responders to an incident at the defined location 102 may be on scene or within the response boundary 104 at the time of the incident or shortly after the incident occurs. Each potential responder may be a person or vehicle with an associated MS (e.g., portable or vehicular MS) capable of communicating wirelessly with each other and/or with a RAN 126. Such potential responding MSs may include, for example, a pedestrian responder MS 112A (e.g., a traffic control officer operating on-foot), a motor vehicle responder MS 114A (e.g., police car), a motor vehicle responder MS 116A (e.g., fire engine), and a human-powered vehicle responder MS 118A (e.g., bicycle officer).

Each of the responder MSs may, in one example, already be actively using RF resources 128 of the RAN 126, which may be a LMR or LTE RAN providing coverage substantially throughout the incident/response area 100, illustrated in FIG. 1 as including a single fixed terminal (BS) 130 coupled to a controller device 132 (e.g., radio controller, call controller, PTT server, zone controller, MME, BSC, MSC, site controller, Push-to-Talk controller, or other network device). As illustrated in FIG. 1, using the response boundary 104 to set group membership for an incident or response required at or near the defined location 102 aids in coordinating a response to the currently occurring event or incident.

However, in addition to the current event or incident situation noted above, there may be other situations in which an initiating MS user wishes to more dynamically form a new communication group that are not possible using existing mechanisms. Accordingly, there is a need for an improved method and apparatus for dynamically forming communication groups, and more particularly, for forming communication groups based not on a current location of currently active MSs, but instead, on a location history of MSs.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
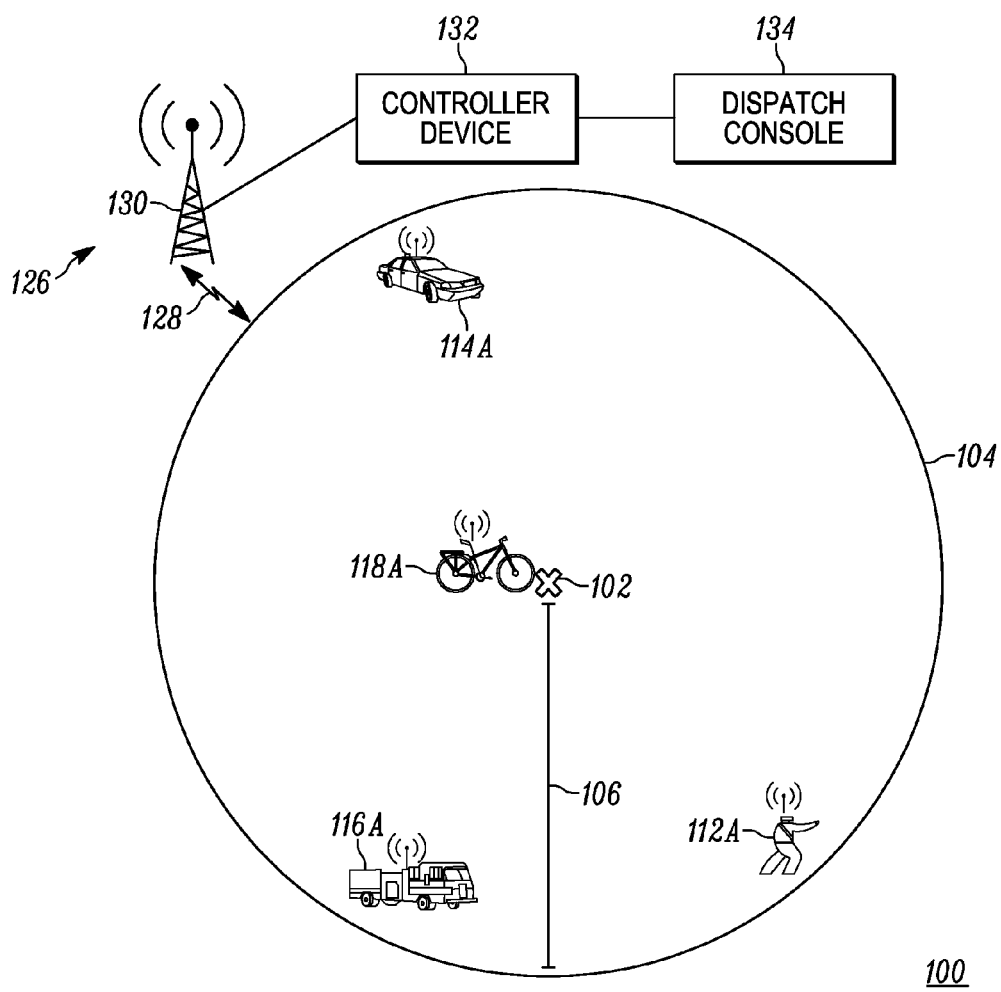
FIG. 1 is a schematic diagram of an existing incident/response area illustrating conventional communication group formation.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for forming communication groups based not on a current location of currently active MSs, but instead, on a location history of MSs.

In one embodiment, a process of forming a communication group based on mobile station location history includes: receiving, at a controller device, a group formation request from a requesting device, the request specifying a location and a time window; identifying, by a controller device, one or more mobile stations determined to be within a threshold area relative to the location during the time window; and causing, by the controller device, a communication group to be created including the identified one or more mobile stations.

In another embodiment, a controller device for forming a communication group based on mobile station location history includes: a transceiver; a data store; and one or more processors configured to: receive, via the transceiver, a group formation request from a requesting device, the request specifying a location and a time window; identify one or more mobile stations determined to be within a threshold area relative to the location during the time window; and cause a communication group to be created including the identified one or more mobile stations.

In a still further embodiment, a requesting device for requesting a communication group based on mobile station location history includes: a transceiver; a memory; and one or more processors configured to: identify a location and time window associated with an event; transmit, via the transceiver, a group formation request specifying the location and the time window, the group formation request requesting formation of a communication group comprising mobile stations located within a threshold area relative to the location during the time window; receive, via the transceiver, a communication group identifier associated with the communication group or identifiers of mobile stations formed in the communication group; and transmit, via the transceiver using the communication group identifier or via the transceiver using the identifiers of mobile stations formed in the communication group, one or more of audio and data to be provided to mobile stations in the formed communication group.

Each of the above-mentioned embodiments will be discussed in more detail below, starting with example device structures of a controller device and mobile station in which the embodiments may be practiced, followed by example schematic diagrams of incident/response areas in which the embodiments may be practiced, further followed by an illustration of processing steps for supporting formation of communication groups based on location history, and finally followed by communication group formation based on location history from a system perspective for both distributed and centralized architectures. Further advantages and features consistent with this disclosure will be set forth in the following detailed description, with reference to the figures.

Figure 2:
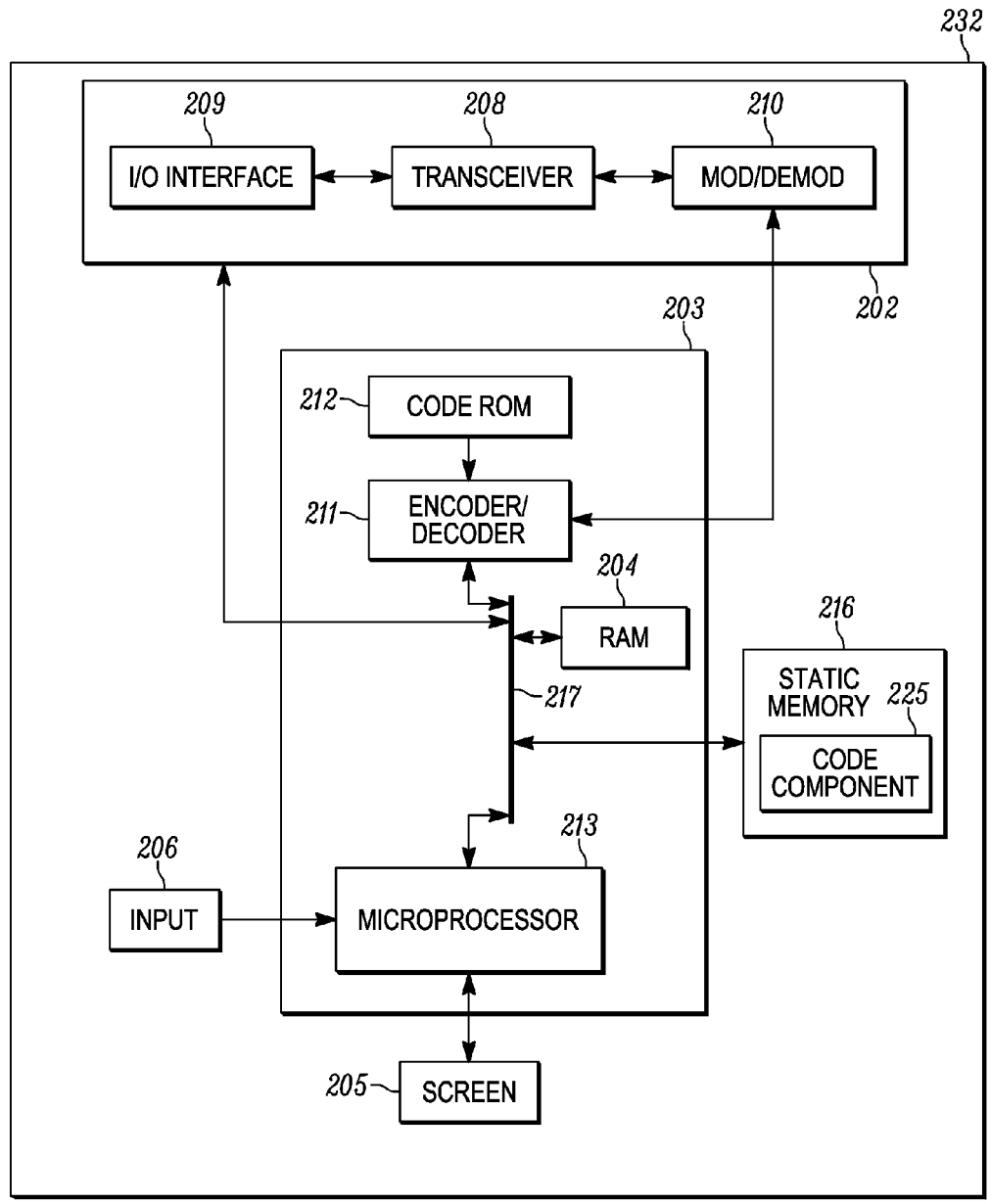
FIG. 2 is a block diagram of a controller device for forming communication groups based on location history in accordance with an embodiment.

1. Example Device Structures for Forming Communication Groups Based on Location History FIG. 2 is an example functional block diagram of a controller device 232 operating within a wireless communication system for forming communication groups based on location history in accordance with some embodiments. As shown in FIG. 2, controller device 232 includes a communications unit 202 coupled to a common data and address bus 217 of a processing unit 203. The controller device 232 may also include an input unit (e.g., alphanumeric keypad, pointing device, etc.) 206 and a display screen 205, each coupled to be in communication with the processing unit 203. In some embodiments, the input unit 206 and display screen 205 may together provide a capacitive touch input device.

The processing unit 203 may include an encoder/decoder 211 with an associated code Read Only Memory (ROM) 212 for storing data for initializing system components, and encoding and/or decoding voice, data, control, or other signals that may be transmitted or received between the controller device 232 and BSs or MSs in the system. The processing unit 203 may further include a microprocessor 213 coupled, by the common data and address bus 217, to the encoder/decoder 211, a Random Access Memory (RAM) 204, and a static memory 216.

The communications unit 202 may include one or more wired or wireless input/output (I/O) interfaces 209 that are configurable to communicate with MSs, BSs, and/or with other devices in or communicably coupled to the system. The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE transceiver, and/or other similar type of wireless transceiver configurable to communicate via a wireless radio network. The communications unit 202 may additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. Static memory 216 may store operating code for the microprocessor 213 that, when executed, performs one or more of the processing, transmitting, and/or receiving steps set forth in FIGS. 6-8 and accompanying text. Static memory 216 may also store, permanently or temporarily, group subscription information that, for each group identifier associated with a particular group of MSs, identifies MSs that are members of the particular group. Additionally or alternatively, static memory 216 may also store (or controller device 232 may have access to, via communications unit 202), MS location history information that identifies, for each MS, a plurality of prior locations and corresponding times when the MS was at or associated with each prior location, consistent with the forthcoming description. Still further, static memory 216 may store (or controller device 232 may have access to, via communications unit 202), spatial, geographical, cartographic, transportation system, and/or other types of information.

Static memory 216 may comprise, for example, a harddisk drive (HDD), an optical disk drive such as a compact disk (CD) drive or digital versatile disk (DVD) drive, a solid state drive (SSD), a tape drive, a flash memory drive, or a tape drive, to name a few.

Figure 3:
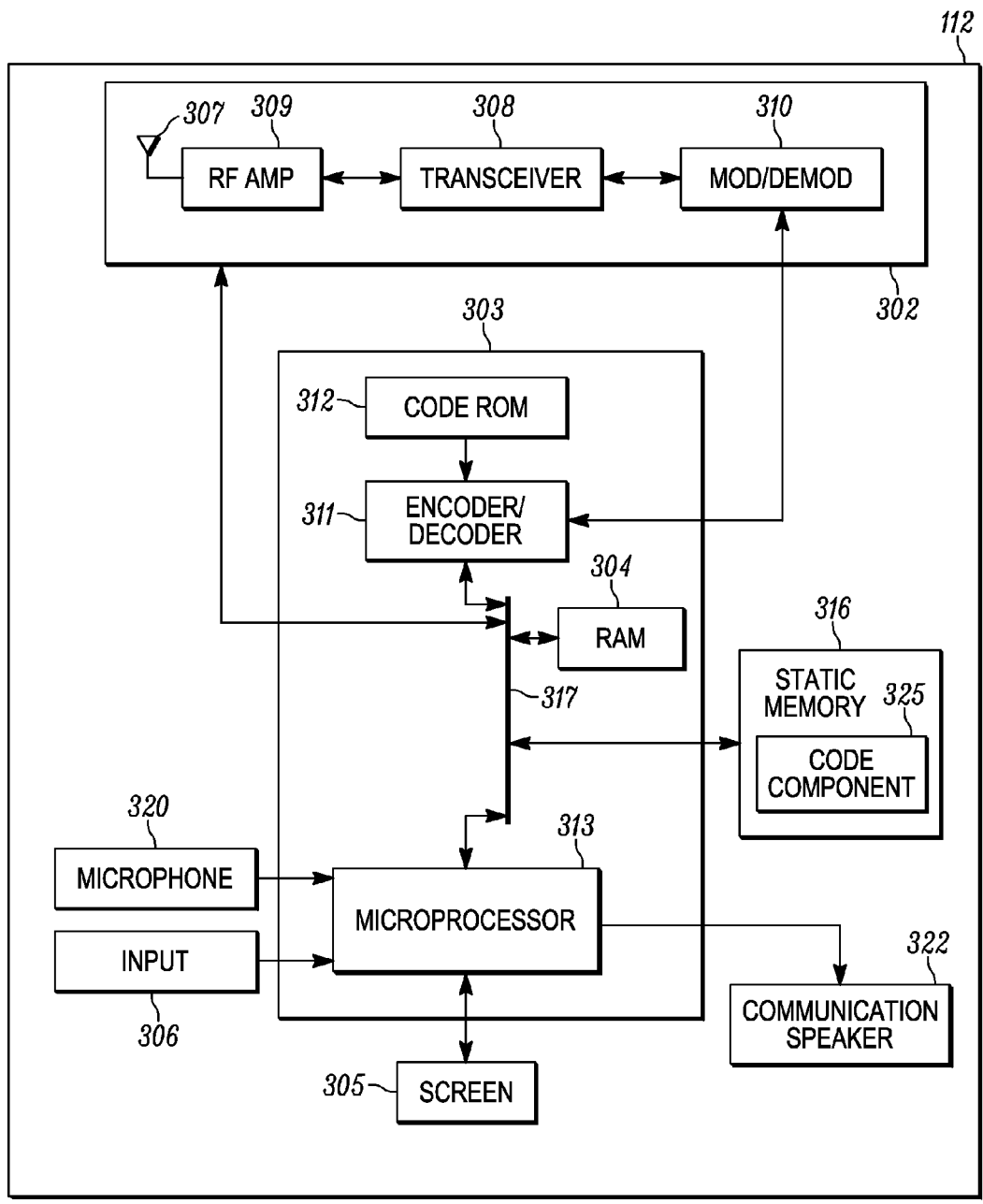
FIG. 3 is a block diagram of a mobile station for requesting and participating in a communication group formed based on location history in accordance with an embodiment.

FIG. 3 is an example functional block diagram of a MS 112 operating within a wireless communication system in accordance with some embodiments. As shown in FIG. 3, MS 112 comprises a radio frequency communications unit 302 coupled to a common data and address bus 317 of a processing unit 303. The MS 112 may also include an input 306 and a display screen 305, each coupled to be in communication with processing unit 303. The input 306 may include an alphanumeric physical keypad (or virtual keypad in cooperation with capacitive touch display screen 305) for inputting text for group communications. The display screen 305 may further function to display group communications received via communications unit 302. A microphone 320 captures audio from a user that is further vocoded by processing unit 303 and transmitted as voice data by communication unit 302 to other MSs or other devices in system. A communications speaker 322 reproduces audio that is decoded from voice data transmissions received from other MSs via the communications unit 302.

The processing unit 303 may also include an encoder/decoder 311 with an associated code Read Only Memory (ROM) 312 for storing data for initializing system components and encoding and/or decoding voice or other traffic information (including image data, audio data, video data, text data, control signals, etc.) that may be transmitted or received by the MS 112. The processing unit 303 may further include a microprocessor 313 coupled, by the common data and address bus 317, to the encoder/decoder 311, a RAM 304, and a static memory 316.

The radio frequency communications unit 302 is a combined receiver and transmitter (e.g., transceiver) having a common antenna 307. The radio frequency communications unit 302 has a transceiver 308 coupled to the antenna 307 via a radio frequency amplifier 309. The transceiver 308 may be a transceiver operating in accordance with one or more standard protocols, such as a DMR transceiver, a P25 transceiver, a TETRA transceiver, a Bluetooth transceiver, an LTE transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE transceiver, and/or other similar type of wireless transceiver configurable to communicate via a wireless network. The transceiver 308 is also coupled to a combined modulator/demodulator 310 that is coupled to the encoder/decoder 311.

The microprocessor 313 has ports for coupling to the input 306 and to the display screen 305. The microprocessor 313 further has ports for coupling to the microphone 320 and to the speaker 322. In some embodiments of the present disclosure, the static memory 316 may store operating code for the microprocessor 313 that, when executed by the microprocessor 313, perform one or more of the MS processing, transmitting, and/or receiving steps set forth in FIGS. 7-8 and accompanying text. Static memory 316 may comprise, for example, a HDD, an optical disk drives such as a CD drive or DVD drive, a SSD, a tape drive, a flash memory drive, or a tape drive, to name a few.

Figure 4:
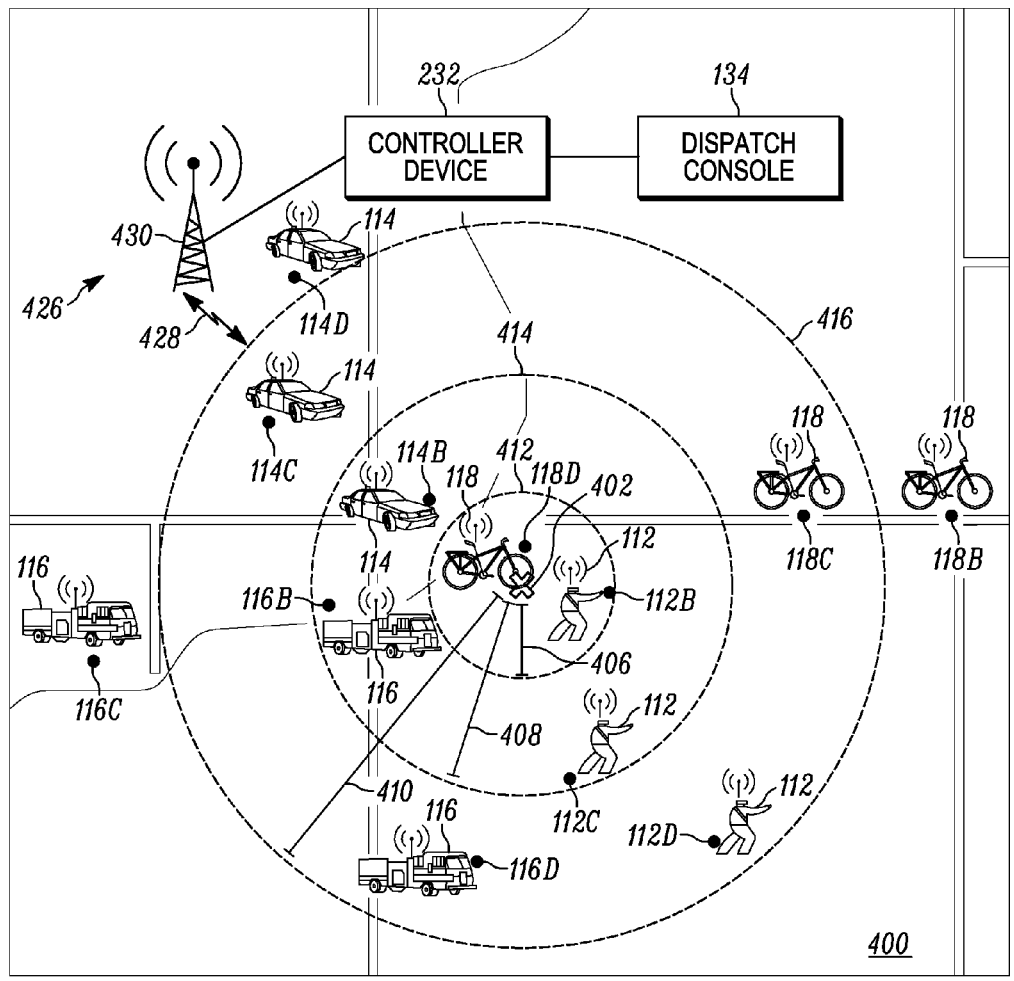
FIG. 4 is a first schematic diagram of an incident/response area illustrating communication group formation based on location history in accordance with an embodiment.
Figure 5:
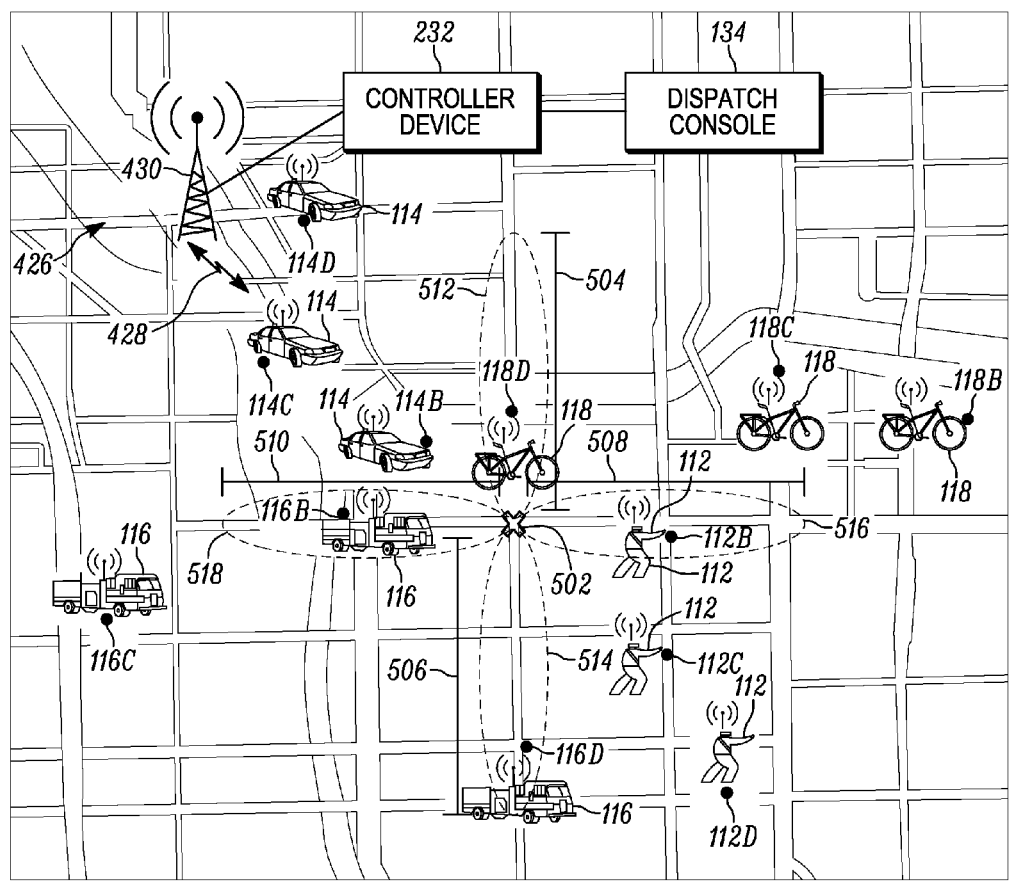
FIG. 5 is a second schematic diagram of an incident/response area illustrating communication group formation based on location history in accordance with a further embodiment.

2. Example Incident/Response Area and Communication Group Formation Using Location History FIGS. 4 and 5 illustrate several variations on communication group formation using location history. For example, FIG. 4 is a cartographic view of a sparse district located in a country (e.g., sparse) environment, in which, for example, relatively few roads or obstacles are present, and in which there is a minimum level of elevation changes and structures that block views.

FIG. 5, on the other hand, is a cartographic view of a dense district located in a city (e.g., dense) environment, in which a relatively larger number of roads are present, and in which there may be an increased number of elevation changes and structures that block views.

In light of these variances, the formation of communication groups based on location history may take into account these variances, as set forth in more detail with respect to each figure below. Of course, the disclosed processes and devices are applicable to other types of districts, and may apply independent of a type of district. Other examples exist as well.

FIG. 4, in particular, illustrates a first example incident/response area 400 including a defined location 402 at or within which an incident has occurred at a particular time or during a particular time window in the past.

Radio access network (RAN) 426 provides wireless communications services to all MSs 112-118 in the incident/response area 400 via fixed terminal 430 and wireless resource 428. While controller device 232 is illustrated in FIG. 4 as being within RAN 426, in other embodiments, controller device 232 may be located outside of RAN 426 and accessible by RAN 426 via a separate wired or wireless communications interface. The wireless resource 428 may be, for example, one or more wireless links supporting a standard or protocol such as GPRS or UMTS, 2G (e.g. GSM), 3G (e.g. WCDMA or Long Term Evolution (LTE)), 4G (WiMAX or LTE), iDEN, wireless LAN (WLAN), ETSI Digital Mobile Radio (DMR), Project 25 (P25) standard defined by the Association of Public Safety Communications Officials International (APCO), Terrestrial Trunked Radio (TETRA), or other radio protocols or standards.

Although only one controller device 232, one fixed terminal 430, and one wireless resource 428 is illustrated in FIG. 4, the present disclosure is not limited as such, and more controllers, more fixed terminals, and more wireless resources could be used in any particular implementation. Furthermore, while a single controller device 232 is illustrated in FIG. 4, a distributed controller may be used that divides functions across multiple devices, perhaps for load balancing reasons. Device controller 232 may additionally function as a call controller, PTT server, zone controller, mobile management entity (MME), base station controller (BSC), mobile switching center (MSC), site controller, Push-to-Talk controller, or other network device for aiding in the control and/or distribution of group audio, text, or other types of group communications amongst served MSs 112-118. Finally, and although not illustrated in FIG. 4, RAN 426 may further comprise one or more additional routers, switches, LANs, WLANs, WANs, access points, or other network infrastructure.

External networks (not shown) may also be accessible to MSs 112-118 via RAN 426. External networks may include, for example, a public switched telephone network (PSTN), a plain old telephone (POT) system, the Internet, or another wireless service provider's network, among other possibilities.

Dispatch console 434 may be directly coupled to controller 432, as shown, or may be indirectly coupled to controller 432 via one or more internal or externals networks. The dispatch console 434 allows an administrator or dispatcher at a dispatch console to initiate infrastructure-sourced location history-based group communications to groups of MSs relative to a defined location indicated by the dispatcher, among other features and functions.

The defined location 402 may be entered in or reported manually by another MS user or a dispatcher or could be automatically determined based on a reported current or past location of another MS. The defined location 402 may be identified as one or more of a street address, an intersection, a global positioning system (GPS) location, an elevation, a triangulated location, an identity (hardware address, IP address, network identifier, etc.) of a fixed wireless transmitting device (e.g., base station, access point, wireless beaconing device, other mobile station, etc.), a uniquely identified structure (such as a particular subway, train line, road, or building), a uniquely identified user or vehicle (e.g., separately tracked by the controller device 232 by user identifier or vehicle identifier), a building floor, or some other form of location identifier.

In some embodiments, the defined location 402 may be used directly as a "threshold area" to form a communication group using location history, and only other mobile stations having a reported location equal to the "threshold area" or reporting a geographic location determined by the controller device to be equivalent to the "threshold area," via some mapping maintained at the controller device 232, are added to the communication group. In other embodiments, the defined location may be a geographic location (reported by the MS user or translated to a geographic location from a location identifier provided by the MS user, such as another user, mobile station, or vehicle that the controller device 232 separately determines the geographic location of) and one or more threshold areas may be determined that modify or expand upon the defined location to be more inclusive of MSs whose users may have witnessed or participated in an event or incident at the defined location, or may have witnessed other attributes or conditions of the areas surrounding the defined location.

For example, distances 406-410 may be used to define threshold areas 412-416 that may be used to identify additional MSs to include in a communication group based on location history. One of distances 406-410 may be specified in a communication group formation request, may be configured in the controller device 232, or may be dynamically determined or varied from a default value or value specified in the request based on other parameters such as time of day, weather conditions, spatial and/or geographical features of the areas around defined location 402, transportation systems, and/or other types of parameters that take into account a witness's visual or auditory range and/or a mobility of a party to the incident or event occurring at or near defined location 402.

For example, the controller device 232 may access weather conditions via a weather server and modify the distances 406-410 up or down based on weather conditions retrieved from the weather server that may positively or negatively affect visibility in the area in the vicinity of the defined location 402. For example, poorer weather may cause distance criterions to decrease while good weather may cause distance criterions to increase. A determined time of day, determined at the controller device 232 or via an external time server device, may also cause distances 406-410 to vary (e.g., increased during the day and decreased at night, for example) based on an impact on visibility. Other examples are possible as well.

Various MSs 112, 114, 116, and 118 are illustrated as they move across different locations 112B-D, 114B-D, 116B-D, and 118B-D over time. Each MS 114-118 in FIG. 4 may have a same or similar structure to MS 112 of FIG. 3. Each MS 112, 114, 116, and 118 may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. In other embodiments, each MS may be a laptop computer, tablet, smart phone, or other communications device capable of transmitting voice and/or data via RAN 426. The group communications architecture provided via RAN 426 allows a single MS, such as MS 112, to communicate with one or more other MSs (such as MSs 114, 116, and/or 118) associated with a formed location-history-based group at the same time.

In particular, MS 112 is associated with a traffic control officer and may move from a location 112B at 12:00 pm, to location 112C at 1:00 pm, and finally to location 112D at 2:00 pm on a particular day, such as December 1. On the same day, MS 114 is associated with a police car and may move from a location 114B at 12:00 pm, to location 114C at 1:00 pm, and finally to location 114D at 2:00 pm. Further, MS 116 is associated with a fire engine and may move from a location 116B at 12:00 pm, to location 116C at 1:00 pm, and finally to location 116D at 2:00 pm on December 1. On the same day, MS 118 is associated with a bicycle officer and may move from a location 118B at 12:00 pm, to location 118C at 1:00 pm, and finally to location 118D at 2:00 pm. Similar to the defined location 402, each of the locations 112B-D, 114B-D, 116B-D, and 118B-D may be a street address, an intersection, a GPS location, a triangulated location, an identity of a fixed wireless transmitting device, a uniquely identified physical structure (such as a subway, train line, road, or building), or some other form of location identifier. Such location information may be manually entered at the MS by a user and stored at the MS or immediately, periodically, or intermittently reported to controller device 232 via RAN 426. In other embodiments, such location information may be automatically detected at each MS via a GPS receiver, triangulation process, wireless network or wireless beacon identification process, optical identification process using an imaging device coupled to the MS, or some other automated process and similarly stored at the MS or reported to the controller device 232 via RAN 426. In the event that the location information is stored at the MS and not immediately, periodically, or intermittently reported to the controller device 232, the location data or information relative to the location data may be provided to the controller device by MSs on request from the controller device 232 in the manner set forth in more detail below. Additionally or alternatively, an infrastructure-based location determination may be implemented using same or similar trilateration techniques via signals received from the MS at a plurality of ground-based fixed terminals. Other method of tracking and reporting MS locations could be used as well.

The time at each respective location may be stored and/or reported by MSs as an absolute time (e.g., Dec. 1, 2014 at 14:01), or a relative time (e.g., entered or determined X number of seconds, minutes, and/or hours ago or determined X number of seconds, minutes, and/or hours since a relative start time). In embodiments in which the location is immediately, periodically, or intermittently reported, the time may be explicitly included in the location report or may be determined based on a transmit or receive timestamp of the message reporting the location via RAN 426. In the case of the infrastructure-based location determination, the time may be determined based on an average time at which the signal or signals were received at the fixed terminals used in calculating the MS's location.

As one example of an operation of forming a communication group based on location history, a police officer associated with an unidentified MS may field a police report on December $2^{nd}$ about a robbery that occurred at defined location 402 on December 1 at approximately 12:30 pm. As part of the investigation, the police officer may wish to speak with all other personnel that were within the vicinity of (e.g., in a threshold area relative to) the defined location 402 during a particular time window such as 12:00 pm-1:00 pm on December $1^{st}$. Accordingly, the unidentified MS may transmit a request to controller device 232 to form a communication group based on MS location history. The request may specify the defined location 402 using any of the location identification mechanisms already set forth above, and may specify the time window of interest in the past (again, using any of the time window identification mechanisms already set forth above).

For example, the police officer may be familiar with the general vicinity of the defined location 402 and may specify a threshold area 414 relative to the location 402 by including a range 408 in the request. Of course, other methods of specifying threshold areas could be used as well, and other possible threshold area definitions may take the form of irregular and/or discontinuous shapes and may include elements of elevation as well. More particularly, in some embodiments, the threshold areas may be based on some other form of cartographic or non-cartographic definition, such as a set of three or more polygon vertices, where each polygon vertex is a GPS coordinate, such as a latitude and longitude pair or a latitude, longitude, and latitude triplet, such as a wireless network or beacon identifier, such as a physical structure or transportation system, or some other form of cartographic definition. Other examples are possible as well.

In response to receiving the request, and using the time window, threshold area, and MS location examples set forth above with respect to FIG. 4, the controller device 232 may access location history information maintained at the controller device 232 or otherwise made accessible to the controller device 232 and determine that MSs 112 (via locations 112B and 112C), 114 (via location 114B), and 116 (via location 116B) meet the time window and threshold area requirements to be added as members of the requested communication group. The communication device 232 then creates the communication group, and the police officer may then communicate with the MSs 112, 114, and 116 (via voice, audio, video, images, control information, text messages, instant messages, SMS, MMS, e-mail, and/or audio/video streams, etc.) regarding the robbery in a quick and automated fashion using the created communication group.

FIG. 5 illustrates a second example incident/response area 500 including a defined location 502 at which an incident or event has occurred at a particular time or during a particular time period in the past. The defined location 502 may be entered, reported, determined, and/or identified similar to defined location 402 of FIG. 4.

In this example, distances 504-510 define example elliptical threshold areas 512-518 that may be used to determine which additional MSs to include in a communication group based on location history. One or all of distances 504-510 may be specified in a communication group formation request, may be configured in the controller device 232, may be dynamically determined or varied from a default value or value specified in the request based on other parameters such as time of day, weather conditions, spatial and/or geographical features of the areas around defined location 502, transportation systems around defined location 502, and/or other types of parameters that take into account a witnesses' visual or auditory range and/or mobility of a party to the incident/event occurring at or near the defined location 502.

RAN 426, fixed terminal 430, controller device 232, and dispatch console 134 perform the same functions and have the same attributes as already described above with respect to FIG. 4. Various MSs 112, 114, 116, and 118 are illustrated as they move across different locations 112B-D, 114B-D, 116B-D, and 118B-D over time, and which locations are tracked and made accessible to controller device 232, in a same manner as that set forth in FIG. 4.

As another example of an operation of forming a communication group based on location history, a social worker associated with an unidentified MS may be interviewing a witness on December $2^{nd}$ about a reported bullying incident and may find out that the incident occurred at location 502 on December 1 between 12:15 and 12:45 pm. As part of the investigation, the social worker may wish to speak with all other personnel that were within a field of view of (e.g., in a threshold area relative to) the location 502 during a particular time window such as 12:00 pm-1:00 pm on December $1^{st}$ that encompasses the incident or event. Accordingly, the unidentified MS may transmit a request to controller device 232 to form a communication group based on MS location history. The request may specify the defined location 502 using any of the location identification mechanisms already set forth above, and may specify the time window of interest in the past (again, using any of the time window identification mechanisms already set forth above).

In one example, the social worker may learn from the report that the parties to the event/incident came from west of the defined location 502 and then headed east of the defined location 502 afterward, and thus may specify threshold areas 516, 518 relative to the location 502 by including distances 508, 510 in the request. Of course, other methods of specifying threshold areas could be used as well. For example, the unspecified MS may specify in the request only the defined location 502, and the controller device 232 may access cartographic information regarding the area surrounding the defined location 502 and determine that the incident could be viewed along north, east, south, and west bound streets (taking into consideration buildings that would block views in other directions), and the controller device 232 may then identify threshold areas 512-518 using distances 504-510. The distances may vary due to known variations in elevation, sun location, weather, etc. that impact an ability of a witness to view the incident or other occurrences or participants, before, during, or after the event or incident occurred. And while the distances 504-510 are illustrated as being converted into threshold areas have an elliptical shape, other shapes such as rectangles could just as well be used. Of course, other non-cartographic location identifiers could be used as well.

In response to receiving the request, the controller device 232 may access location history information maintained at or accessible to the controller device 232 and determine using the time window and threshold areas set forth above, that MSs 112 (via location 112B) and 116 (via location 116B) meet the time window and threshold area requirements to be added as members of the requested communication group. The controller device 232 then creates the communication group and the social worker may then communicate with the MSs 112 and 116 and hence their users (via voice, audio, video, images, control information, text messages, instant messages, SMS, MMS, e-mail, and/or audio/video streams, etc.) to request additional information regarding the bullying incident in a quick and automated fashion using the created communication group.

In addition to the circular threshold areas of FIG. 4 and elliptical threshold areas of FIG. 5, other regular and irregularly defined threshold areas could be requested by a MS and/or identified at controller device 232 relative to a defined location. For example, if a requesting device uniquely identifies a subway system (whether or not including a particular line of that subway system) in a request for a communication group based on location history, the controller device 232 may either (i) access a geographic information system and determine threshold areas (for example, GPS locations including latitude/longitude pairs or pre-configured associated geo-fence definitions) associated with that identified subway system, subsequently finding MSs reporting geographic locations in those threshold areas during the specified time window or (ii) find MSs reporting that they were in the identified subway system (or on a particular train of that system) during the specified time window.

In the latter case, the reporting MSs' users may have manually entered a unique identifier associated with the identified subway system or train line to identify their location, or in some embodiments, the reporting MS may detect some other signal (wireless network identifier, NFC device, wireless beacon, optical character or location identification, etc.) indicative of the MS' presence in the identified subway system or train line, and report either the identity of the detected signal or beacon or the identity of the device transmitting the signal or beacon, or may report a translated MS location (retrieved from a database mapping such signals to geographic or structural locations) determined as a function of the detected signal. Still further, reported GPS or triangulated locations (perhaps including elevation as well) received at the controller device 232 may be translated by the controller device based on geographic, cartographic, or transportation system information available to the controller device 232, such that a reported GPS location and/or elevation indicative of a MS's location at an entrance to a subway system, for example, may be used by the controller device 232 to subsequently infer that the MS is in the subway system, and such that a record of such is maintained at or accessible to the controller device 232 for later use. Similar considerations could be used for buildings and other locations. Other method of reporting and tracking MS locations and matching MS locations to requested locations and/or threshold areas could be used as well.

3. Processes for Forming Communication Groups Based on Location History

Figure 6:
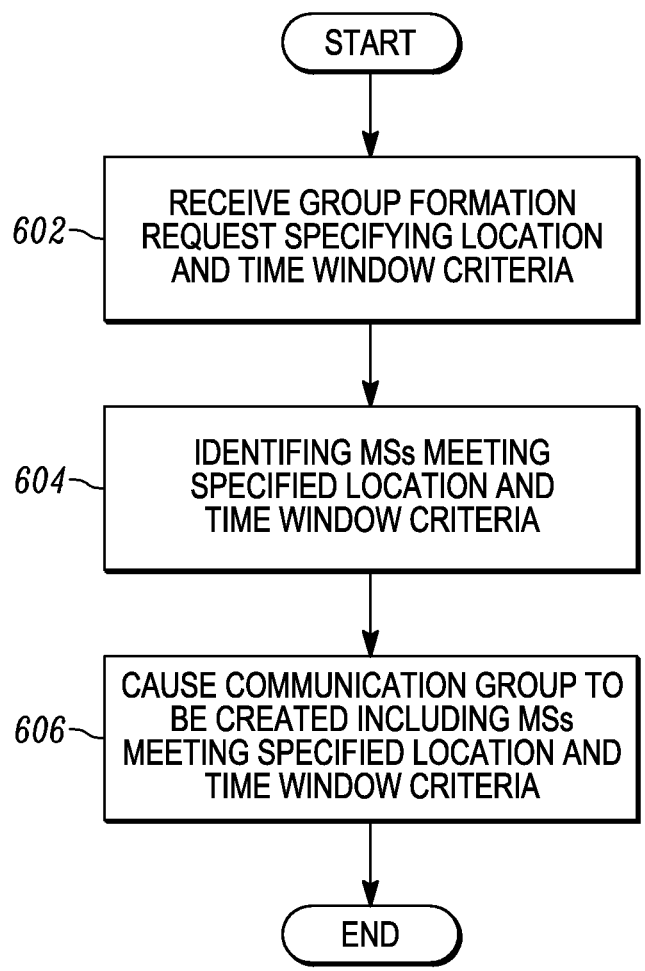
FIG. 6 is a flow diagram illustrating a process executable at the controller device of FIG. 2, 4, or 5 for forming communication groups based on location history in accordance with an embodiment.

FIG. 6 includes a flow chart illustrating a process 600 including processing steps executable at the controller device 232 of FIGS. 2, 5, and 6 for forming communication groups based on location history. Of course, additional steps, receptions, and/or transmissions not disclosed herein could be additionally added before, after, or in-between steps, receptions, and/or transmissions disclosed in FIG. 6, and the presence of such additional steps, receptions, and/or transmissions would not negate the purpose and advantages of the examples set forth in detail throughout the remainder of this disclosure.

At step 602, a controller device in a RAN receives a request from a requesting device (e.g., a requesting MS or requesting dispatch console) for formation of a new communication group using location and time window criterions specified in the request.

At step 604, the controller device identifies one or more MSs meeting the specified location and time window criterion. In some embodiments, the location specified in the request may be associated with a single point, address, transportation system, wireless network, wireless beacon, identified vehicle, identified mobile station, user identifier, or physical structure, or multiple points, addresses, transportation systems, wireless networks, wireless beacons, identified vehicles, identified mobile stations, user identifiers, or physical structures, and the controller device may directly use such specified location as the threshold area or areas to identify other MSs associated with the same single or multiple points, addresses, transportation systems, wireless networks, wireless beacons, or physical structures during the specified time window. In other embodiments, the controller device may use pre-configured algorithms (such as set forth with respect to FIG. 4) or other databases (such as set forth with respect to FIG. 5) to identify one or more continuous or discontinuous threshold areas that modify or expand upon the specified location. In other embodiments, the MS may, in addition to specifying the location within the request, additionally specify the threshold areas themselves in the request, which the controller device may use directly in identifying MSs to add to the communication group or further modify or expand upon using same or similar pre-configured algorithms or other databases. Once the threshold areas are identified, MSs have a location within the threshold area or areas during the specified time window are identified. As set forth in more detail below with respect to FIGS. 7 and 8, MS location information may be stored and retrieved in a centralized or distributed manner.

Returning to FIG. 6, at step 606, the controller device creates a communication group including MSs meeting the threshold area and time window criteria (and in some embodiments, including the requesting device as well). The identifies of the communication group member MSs may be stored at the controller device and/or provided back to the requesting device and/or MSs identified at step 604. In some embodiments, a unique group identifier may be assigned to the created communication group, and the identifier provided back to the requesting device and/or the MSs identified at step 604 by the controller device for use in further transmitting group communications, such as encoded voice, audio, video, images, control information, text messages, instant messages, SMS, MMS, e-mail, and/or audio/video streams.

Figure 7:
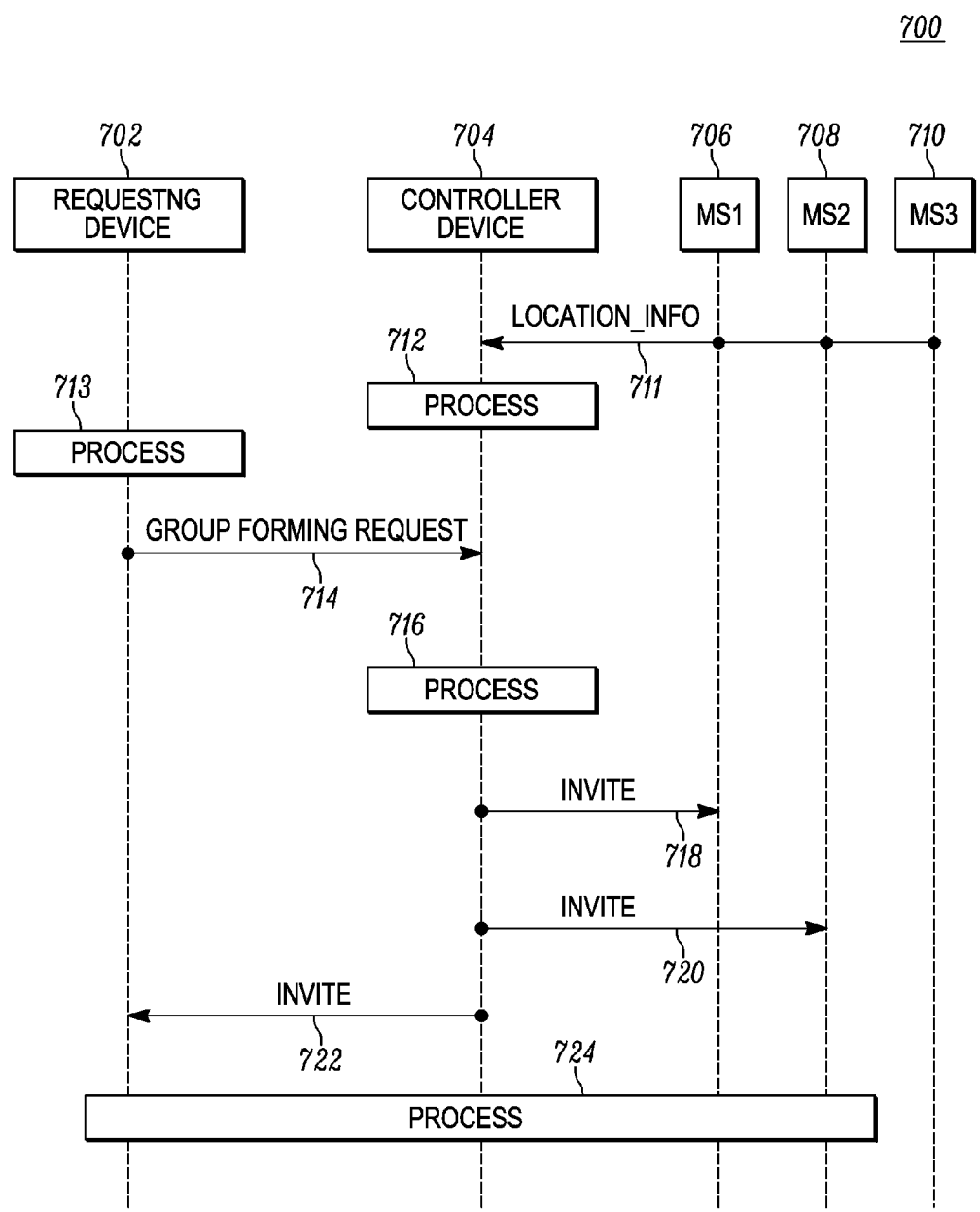
FIG. 7 is a ladder diagram illustrating a centralized process for forming communication groups based on location history in accordance with an embodiment.
Figure 8:
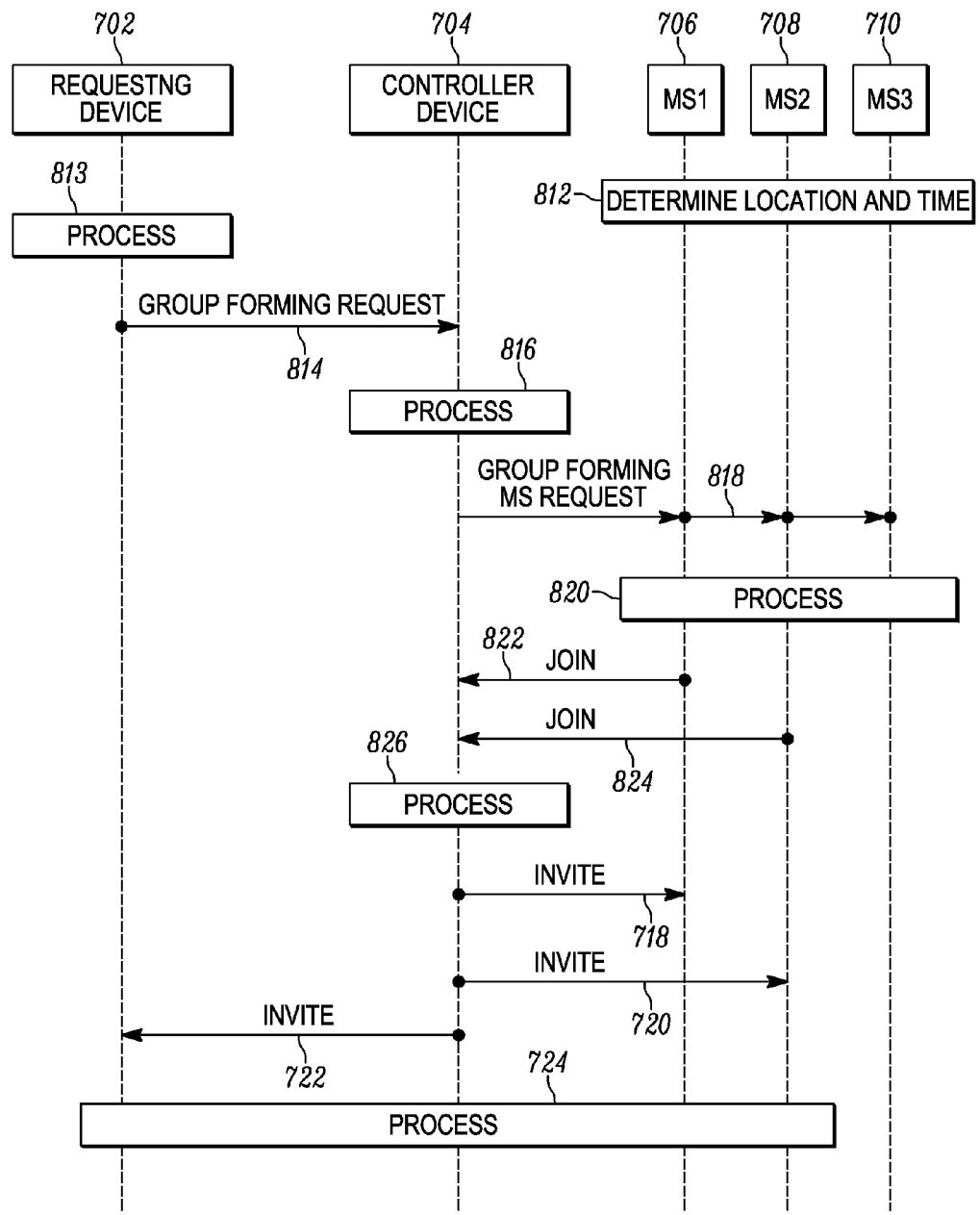
FIG. 8 is a ladder diagram illustrating a decentralized process for forming communication groups based on location history in accordance with an embodiment.

FIGS. 7 and 8 illustrate, via separate ladder diagrams, two different exemplary ways in which communication groups based on location history may be formed. FIG. 7 illustrates a centralized group formation mechanism while FIG. 8 illustrates a distributed group formation mechanism.

Each of the ladder diagrams set forth in FIGS. 7 and 8 involve a requesting device 701, which may be another MS or a dispatch console, a controller device 704 that may be the same or similar to controller device 232 of FIGS. 2, 4, 5, and 6, and MSs 706-710 that may have a same or similar structure as MS 112 of FIGS. 3-5.

In ladder diagram 700 of FIG. 7, MSs 706-710 periodically or intermittently transmit Location_Info 711 messages, each including an indication of the MS's location, to the controller device 704. At step 712, the controller device 704 stores the location information along with time information included in the Location_Info 711 message itself or otherwise determined by a time of receipt of the Location_Info 711 message. The location and time information may be stored in a location database at the controller device 704 or in a location database at some other computing device accessible to the controller device 704. In some embodiments, the controller device 704 may determine the MSs' 706-710 location using some infrastructure-based location determination mechanism, such as a triangulation mechanism using a plurality of fixed terminals in a same RAN as controller device 704. In still further embodiments, the MSs 706-710 may be queried for location information by controller device 704 at periodic or intermittent intervals, and the controller device 704 may process responses thereto at a step similar to step 712.

At step 713, the requesting device 702 detects a request to form a communication group based on location history, and subsequently transmits a GroupFormingRequest 714 to the controller device 704. The requesting device 702 may detect the request as a result of a user manipulation of a user interface at the requesting device. The requesting device may further receive an identity of a specified location and time window via the same user interface. In other embodiments, the requesting device may use its own automatically determined current location (identified in any manner already cited above), or may identify a target MS whose previously-reported location or locations during the time window should be used as the specified location or locations for forming the communication group.

In some embodiments, the time window is a non-zero time window in the past that does not include a current time, while in other embodiments, it may include the current time. The time window may be specified as a start time and a duration, or a start time and an end time. The start and/or end times may be specified in absolute values or in values relative to the current time or some prior reference time. In some examples, the MS may display a calendar and the MS user may select one or more dates and/or times from the calendar to specify the time window via the user interface.

At step 716, the controller device 704 receives the GroupFormingRequest 714 and processes the request. As part of this process, the controller device 704 retrieves from the GroupFormingRequest 714 message or otherwise identifies using the specified location in the GroupFormingRequest 714 message one or more threshold areas relative the specified location. In some embodiments, the threshold areas will be substantially larger than the specified location (as illustrated in FIGS. 4 and 5 above), and may involve the translation of a specified location into a geo-fence or similar area using pre-configured algorithms and/or retrieved database information. In other embodiments, the threshold area may be equal to the specified location (e.g., such as in those situations in which the specified location is an address, an identified physical building or structure, an identified transportation system or vehicle, a wireless network, or a wireless beacon, and MS location information accessible to the controller device 704 similarly identifies tracked MS locations). Once the threshold areas are identified, the controller device accesses the location database populated at step 712 to identify MSs that reported a location falling within or meeting the threshold area requirement during the time window specified in the request. Once the MSs meeting the threshold area and time window requirements are identified, the controller device 704 creates a communication group that includes the identified MSs and, in some embodiments, the requesting device 702 as well. As part of this process, the controller device 704 may assign a group identifier to the created group and store the identifier for mapping the group identifier to each of the members of the created communication group. In this example, it is assumed that MSs 706 and 708, but not MS 710, meet the threshold area and time window requirements, and are thus included in the crated communication group.

The controller device 704 subsequently transmits invite messages 718-722 to the members of the group, including the MS 706, MS 708, and requesting device 702. At step 724, each of the MSs 706, 708 processes the respective invite messages 718-722. Processing the invite messages 718-722 may include, for example, storing a group identifier included in the invite message and, when subsequent group communications are received including the group identifier, playing back the group communications (including displaying text, video, and/or images and/or playing back audio). In some embodiments, invite messages 718 and 720 may not be sent and process step 724 not executed at MSs 706, 708, but instead, the invite message 722 may provide the requesting device 702 with the group identity or individual unique identities of the MSs 706 and 708, such as e-mail addresses, phone numbers, or messaging user-ids, which the requesting device 702 may subsequently use to transmit group communications to MSs 706, 708.

In ladder diagram 800 of FIG. 8, MSs 706-710 periodically or intermittently determine their current location and store the location information along with time information identifying a time at which the location was determined. The location and time information may be stored locally in a permanent or removable storage at each MS. The location may be determined automatically via a GPS, triangulation, optical recognition, wireless network identification, or wireless beacon identification process as set forth above, or may be determined in cooperation with a user (e.g., the MS may periodically or intermittently request that the user identify and/or confirm a current location of the MS via its user interface, or the user of the MS may independently do so on a periodic or intermittent basis).

At step 813, and similar to step 713 of FIG. 7, the requesting device 702 detects a request to form a communication group based on location history, and subsequently transmits a GroupFormingRequest 814, similar to GroupFormingRequest 714 of FIG. 7, to the controller device 704.

At step 816, the controller device 704 receives the GroupFormingRequest 814 and processes the request. As part of this process, the controller device 704 retrieves from the GroupFormingRequest 814 message or otherwise identifies using the specified location in the GroupFormingRequest 814 message one or more threshold areas relative the specified location similar to the manner set forth in step 716 of FIG. 7.

Once the threshold areas are identified, the controller device 704 queries all active MSs under its control in the wireless network via GroupFormingMSRequest 818 messages. Each GroupFormingMSRequest 818 message identifies the threshold area or areas determined by the controller device at step 816 and the time window specified in the GroupFormingRequest 814 message. At step 820, each MS 706-710 receiving the GroupFormingRequest 814 message extracts the time window and threshold areas from the message and compares the time window and threshold area criterion to the MS location and time information stored at step 812. If the receiving MS determines, based on its stored location and time information, that it meets the threshold area and time window requirements set forth in the Group-FormingRequest 814 message, it transmits a join message in response. In this example, it is assumed that MSs 706 and 708, but not MS 710, meet the threshold area and time window requirements, and thus transmit respective Join messages 822-824 back to the controller device 704.

At step 826, the controller device processes the Join messages 822-824 and creates a communication group that includes each MS transmitting a Join message 822-824 and, in some embodiments, includes the requesting device 702 as well. As part of this process, the controller device 704 may assign a group identifier to the group that maps the identifier to each of the members of the created communication group.

The controller device 704 subsequently transmits invite messages 718-722 to the members of the group, including the MS 706, MS 708, and requesting device 702. At step 724, each of the MSs 706, 708 and requesting device 702 process the respective invite messages 718-722 similar to the manner set forth in FIG. 7 above. In some embodiments, invite messages 718 and 720 may not be sent and process step 724 may not be executed at MSs 706, 708, but instead, the invite message 722 may provide the requesting device 702 with the group identity or individual unique identities of the MSs 706 and 708, such as e-mail addresses, phone numbers, or messaging user-ids, which the requesting device 704 may subsequently use to transmit group communications.

4. Conclusion

In accordance with the foregoing, an improved method and apparatus for forming communication groups based not on a current location of currently active MSs, but instead, on a location history of MSs, allowing communication groups related to a particular event or occurrence in the past to be created more efficiently and more effectively.

As a result, a more intuitive, useful, and efficient group communications system can be provided, improving communication capabilities of wireless transmission systems. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of forming a communication group based on mobile station location history, the method comprising:

receiving, at a controller device, a group formation request from a requesting device, the request specifying a location and a time window of interest that is in the past;

identifying, by the controller device, one or more mobile stations determined to be within a threshold area relative to the location during the time window of interest; and causing, by the controller device, a communication group to be created including the identified one or more mobile stations;

wherein the step of identifying comprises causing, by the controller device, a group forming mobile station request message to be transmitted to each of the one or more mobile stations including the threshold area and the time window of interest and identifying the one or more mobile stations that transmit a join response indicating their presence within the threshold area during the time window of interest.

2. The method of claim 1, wherein the step of identifying comprises accessing a location history database of mobile station locations and corresponding time windows and identifying the one or more mobile stations determined to be within the threshold area relative to the location during the time window of interest as a function of a content of the location history database.

3. The method of claim 2, further comprising periodically or intermittently receiving current location information from each of the one or more mobile stations and storing the current location information including a time associated with the current location information in the location history database.

4. The method of claim 1, wherein causing the communication group to be created comprises transmitting a group communication invite message to each of the requesting device and the identified one or more mobile stations.

5. The method of claim 4, wherein the invite message includes a group identifier assigned to the communication group.

6. The method of claim 1, wherein causing the communication group to be created comprises transmitting a message to the requesting device including one of a group identifier assigned to the communication group and mobile station identifiers uniquely identifying each of the one or more mobile stations in the communication group.

7. The method of claim 1, further comprising causing one or more of audio and data transmitted by the requesting device to be provided to the one or more mobile stations in the created communication group.

8. The method of claim 7, wherein causing the one or more of audio and data transmitted by the requesting device to be provided to the one or more mobile stations in the created communication group comprises receiving the one or more of audio and data transmitted by the requesting device at one of a push-to-talk (PTT) server and a repeater, and forwarding, via the one of the PTT server and the repeater, the one or more of audio and data transmitted by the requesting device to the one or more mobile stations in the created communication group.

9. The method of claim 7, wherein the requesting device is one of a mobile station and a dispatch console.

10. The method of claim 7, wherein data is transmitted by the requesting device and is provided to the one or more mobile stations in the created communication group, the data comprising one of an instant message, a text message, e-mail, a short message service (SMS) message, and a Multimedia Messaging Service (MMS) message.

11. The method of claim 7, wherein audio is transmitted by the requesting device and is provided to the one or more mobile stations in the created communication group, the audio being sent alone or accompanying one of image and video data.

12. The method of claim 1, wherein the one or more of audio and data transmitted by the requesting device to be provided to the one or more mobile stations in the created communication group is a request for information regarding an event occurring at or near the location during the time window of interest.

13. The method of claim 1, wherein the time window of interest specifies a non-zero time window in the past that does not include a current time.

14. A method of forming a communication group based on mobile station location history, the method comprising:

receiving, at a controller device, a group formation request from a requesting device, the request specifying a location and a time window of interest that is in the past, identifying, by the controller device, one or more mobile stations determined to be within a threshold area relative to the location during the time window of interest, and causing, by the controller device, a communication group to be created including the identified one or more mobile stations;

wherein the threshold area is determined by the controller device as a function of the specified location and is varied as a function of cartographic information or transportation system information associated with the location retrieved by the controller device.

15. The method of claim 1, wherein the communication group is a group for transmitting and receiving audio and/or data between a plurality of group members.

16. The method of claim 1, wherein the communication group consists of the identified one or more mobile stations and not including the requesting device.

17. A controller device for forming a communication group based on mobile station location history, the controller comprising:

a transceiver;

a data store; and one or more processors configured to:

receive, via the transceiver, a group formation request from a requesting device, the request specifying a location and a time window of interest that is in the past;

identify one or more mobile stations determined to be within a threshold area relative to the location during the time window of interest; and cause a communication group to be created including the identified one or more mobile stations;

wherein the identifying one or more mobile stations determined to be within a threshold area relative to the location during the time window of interest comprises causing a group forming mobile station request message to be transmitted, via the transceiver, to each of the one or more mobile stations including the threshold area and the time window of interest and identifying the one or more mobile stations that transmit a join response, received via the transceiver, indicating their presence within the threshold area during the time window of interest.

* * * * *